Nov. 11, 1941.   A. L. HOLCOMB   2,262,141
PHASING MECHANISM
Filed Oct. 12, 1939
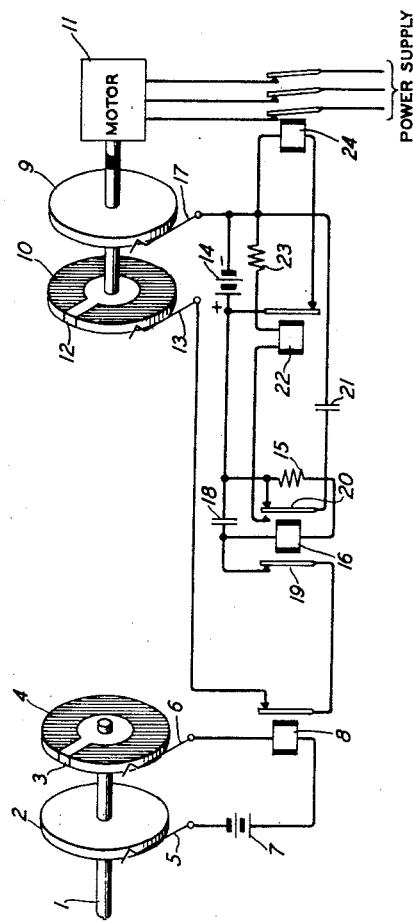
INVENTOR
A. L. HOLCOMB
BY
G. H. Hyatt
ATTORNEY Patented Nov. 11, 1941

2,262,141

UNITED STATES PATENT OFFICE 2,262,141

PHASING MECHANISM

Arthur L. Holcomb, Tarzana, Calif., assignor to Electrical Research Products, Inc., New York, N. Y., a corporation of Delaware Application October 12, 1939, Serial No. 299,063

1 Claim. (Cl. 172—293)

This invention relates to means for establishing the proper phase relation between a plurality of synchronously moving mechanisms or for restoring such relation when they get out of phase due to some casual occurrence.

The object of the invention is to bring one of the mechanisms into the desired phase relation with the other mechanisms by automatically increasing the angle of lag of this mechanism until the mechanism is again in phase.

A feature of the invention is a relay group actuated by the out-of-phase indicator, to automatically increase the angle of lag of one mechanism by an amount determined by the relay group and not dependent upon the phase relationship at the time of the indication.

The invention is applicable to any synchronously moving mechanisms, and is particularly useful in taking motion pictures by the background projection method. In this method, in general, the background of the picture is projected by a motion picture projector on a screen, the local action is enacted in front of the screen, and the background and local action are photographed by one or more cameras. It is important that the camera shutters should only be open during the time that the shutter of the motion picture projector is open. Thus, the motion picture projector and the cameras must not only run at the same speed, but the shutters must also be in the same phase. The projector and cameras may be driven at the same speed by alternating current synchronous motors, or by other motors interlocked in the usual way through a local circuit. The present invention is associated with the projector and camera shutters and operates on one of the motors to restore the proper phase relation.

The single figure of the drawing shows the invention embodied in a background projection system.

It is, of course, evident that any of the motors may be selected as the controlling motor, but, for convenience of illustration, it will be assumed that the projector motor is controlling the camera motors, though no limitation upon the scope of the invention is implied by such assumption.

The shaft 1 is associated with the projector, and driven at a speed having a known relationship with the speed and angular position of the shutter shaft. A slip ring 2 mounted on the shaft is connected to the conducting segment 3 in the insulating disc 4. The brushes 5, 6 bear respectively upon the slip ring 2 and disc 4.

When the brush 6 is in contact with the segment 3, a circuit is closed from battery 7 through brush 5, ring 2, segment 3, brush 6, relay 8 to battery 7, operating relay 8.

The only function of the slip ring 2, and disc 4 is to produce a momentary operation of the relay 8 at a fixed point in the revolution of the shaft, thus the details of this circuit closer may be widely varied. For example, the brushes 5, 6 may both bear upon the disc 4 and be momentarily connected by the segment 3, or two electrically connected segments may be used, or a projection on the disc 4 or on the shutter itself may press two springs into contact.

The slip ring 9 and disc 10 are mounted on a shaft driven by the camera motor 11. The motor 11 is shown driving the ring 9 and disc 10 directly, but the shaft may obviously be geared to the motor or driven in any other convenient manner. As the function of the ring 9 and disc 10 is similar to the function of the ring 2 and disc 4, the details of this circuit closer may also be widely varied.

If the shafts are in the proper phase relation, the segment 12 is in contact with the brush 13 at the time that the segment 3 is in contact with the brush 6. The relay 8 is thus operated, opening the circuit from the brush 13 and no adjustment takes place.

The function of the relay 8 is merely to open the circuit of the brush 13 when the shafts are in phase. If the disc 4 be made of conducting material, and the segment 3 be made of insulating material, the relay 8 may be omitted. Other switching means may also be used to attain the same result.

When the shafts are out of phase, the brush 13 makes contact with segment 12 when the relay 8 is not operated. A circuit is then closed from battery 14, through resistor 15, relay 16, contacts of relay 8, brush 13, segment 12, ring 9, brush 17 to battery 14, operating relay 16, and charging the capacitor 18. The sole function of the rings, discs, segments and relay 8 is to give a momentary impulse when the shafts are out of phase, which operates relay 16 and causes capacitor 18 to be charged. Relay 16 operates, opening the operating circuit at the spring 19.

A circuit may be traced from battery 14 through the back contact and spring 20 of relay 16, capacitor 21 back to the battery 14. Capacitor 21 is normally charged over this circuit.

When relay 16 operates, the capacitor 18 discharges through relay 16 and resistor 15, holding relay 16 operated until the capacitor 18 is nearly discharged. The time of discharge is fixed by the capacitance of the capacitor 18 and the resistance of the resistor 15.

The operation of relay 16 moves the spring 20 from the back contact to the front contact closing a circuit from capacitor 21 through spring 20 and the front contact to relay 22, thence through resistor 23 to capacitor 21, operating relay 22. Relay 22 will remain operated during the discharge of the capacitor 21, which is fixed by the capacitance of the capacitor 21 and the resistance of the resistor 23.

A circuit may be traced from battery 14 through relay 24, springs of relay 22 to battery 14. This circuit normally keeps the relay 24 operated, closing the circuit from the power supply to the motor 11. When the relay 22 operates, it opens this circuit and releases the relay 24 thus opening the circuit to the motor 11.

The circuit of the motor 11 will be kept open so long as relay 22 is operated. The relay 22 will be operated for a time determined by the discharge of the capacitor 21, but can operate only once each time the relay 16 operates. The release of relay 16 is determined by the discharge of the capacitor 18. Thus, the time during which the circuit of the motor 11 is open is determined only by the relay group and is not affected by the degree of phase difference between the shafts. In a typical case, this time was adjusted so that the motor 11 would slip back through an angle equal to about two poles.

A number of cameras may be controlled by one projector by providing a plurality of similar relay groups, all controlled by the brushes 5, 6.

The battery 14 may be replaced by any suitable source of unidirectional current, such as rectified alternating current.

What is claimed is:

In combination, a plurality of synchronously rotatable shafts, motors for driving said shafts, a power circuit for one of said motors, a circuit momentarily closed when said shafts are out of phase, a relay operated by said closure, a capacitor associated with said relay to keep said relay operated during the discharge of said capacitor, a second relay operated by said relay, means controlled by said second relay to open said power source, and a second capacitor associated with said second relay to keep said relay operated during the discharge of said capacitor.

ARTHUR L. HOLCOMB.